Feb. 17, 1970   C. B. NOLTE ET AL   3,495,842
LOW FRICTION ROTARY SHAFT BEARING SEAL
Filed Jan. 29, 1968

INVENTORS
CLAUDE B. NOLTE
BY GEORGE F. YOUNGER
*Fulwider, Patton, Rieber,
Lee, and Utecht*
ATTORNEYS ища
United States Patent Office 3,495,842
Patented Feb. 17, 1970

3,495,842
LOW FRICTION ROTARY SHAFT BEARING SEAL
Claude B. Nolte, Placentia, and George F. Younger, Norco, Calif., assignors to Kingmann-White, Inc., Placentia, Calif., a corporation of Texas
Filed Jan. 29, 1968, Ser. No. 701,383
Int. Cl. F16j *15/34, 15/54*
U.S. Cl. 277—81                                    3 Claims

ABSTRACT OF THE DISCLOSURE

A bearing seal for a rotary shaft transmitting motion from within a high fluid pressure vessel to the outside thereof without leakage comprising a narrow pressure bearing of a plastic of low coefficient of friction, such as the TFE resin tetrafluoroethylene, having an outside diameter substantially larger than the maximum diameter of a stepped shaft which has major and minor diameters providing a shoulder which is rounded to engage the pressure side of the bearing as a moving seal face to apply an outward component of force partially counteracting the forces incident to the high pressure tending to deflect the bearing radially inward. The radial thickness of the bearing is preferably large compared to its axial thickness for mechanical strength against radial deflection, the axial thickness being half or less than half of the minor diameter of the shaft.

BACKGROUND OF THE INVENTION (1) This invention relates to seals for rotating shafts providing for transfer of rotary motion from within a high pressure vessel to the outside thereof with low friction and essentially zero leakage of high pressure fluid from within the pressure vessel.

(2) The sealing of rotating shafts against high pressure leakage with low friction has been attempted in the past with lubricated, close tolerance, lapped bearings, with torque tubes and, more recently, with low coefficient of friction plastic pressure bearings such as TFE resins of which the best known is tetrafluoroethylene, commercially identifiable under its trademark Teflon. Such materials will be hereinafter referred to by their standard chemical designation TFE and a conventional form thereof is illustrated in FIGURE 1 which shows a high pressure housing 11 providing a high pressure fluid chamber 12 in which a rotary shaft 13 has its inboard end supported in a bearing 14. A lever arm 15 is rigidly mounted on the shaft 13 and is engaged to be moved by an arm 16 connected to any pressure-responsive means, such as a bellows system for measuring differential pressure. A gland 17 is sealably screwed into the housing and within the gland is disposed a TFE pressure bearing 18 through which extends the minor diameter portion 19 of the shaft 13. Between the major diameter portion of the shaft 13 and its minor diameter portion 19 is a flat shoulder 21 which serves as a moving seal face on the shaft and bears against the high pressure side of the bearing 18. The outside periphery of the bearing 18 at 22 fits the inner bore of the gland fairly closely and the inner bearing surface 23 likewise fits the minor diameter surface of the shaft portion 19. The pressure difference between the chamber 12 and the exterior of the housing 11 forces the sealing face 21 of the shaft 13 against the pressure side of the sealing bearing 18 and likewise pushes the low pressure side of the bearing against the static sealing face 24 provided by the gland shoulder. The pressure within the chamber 12 is applied upon the peripheral surface 22 of the bearing 18 and this, together with the side squeezing pressure on the bearing, has a tendency to deflect it radially inwardly in the direction of the arrows 25. This grips the shaft portion 19 very tightly to produce substantial friction from the standpoint of an instrument type device combining low available energies with high accuracy requirement. Furthermore, the axial thickness or length of the bearing increases the effect of the radius of gyration on the columnar stability of the bearing. As illustrated in FIGURE 1, the axial thickness of the bearing may be equal to or greater than the diameter at shaft portion 19. Furthermore, the minor diameter portion 19 is relatively thin and mechanically weak.

SUMMARY OF THE INVENTION

In the present invention, a TFE pressure-bearing seal is provided which has an axial thickness or length of half or less than half the minor diameter of the shaft being sealed, while the outside diameter of the seal is substantially greater than the major diameter of the shaft.

The radial thickness of the seal strengthens it mechanically against deflection radially inwardly and this, together with the smaller area engaging the axial shaft surface, significantly reduces the bearing friction. At the same time, the minor diameter of the shaft is made larger to increase its mechanical strength and the shoulder between the major and minor diameters of the shaft is rounded and engages the high pressure side of the bearing seal to introduce an outward component of force opposing radially inward deflection of the bearing seal. This also reduces the pressure on the axial bearing surfaces and further significantly reduces the frictional forces opposing shaft rotation.

The axial thickness of the pressure-bearing seal is desirably half or less than half the minor diameter of the shaft to secure the desired reduction in friction while maintaining sufficient bearing support for the shaft. For example, the minor diameter portion of the shaft may be made three times as strong as that of the prior art of FIGURE 1 while at the same time reducing the frictional resistance to rotation to one-third that of the prior art device, thus giving a much lower frictional system with a stronger shaft while retaining essentially zero leakage of the high pressure fluid.

DESCRIPTION OF THE PREFERRED EMBODIMENT

Figure 2:
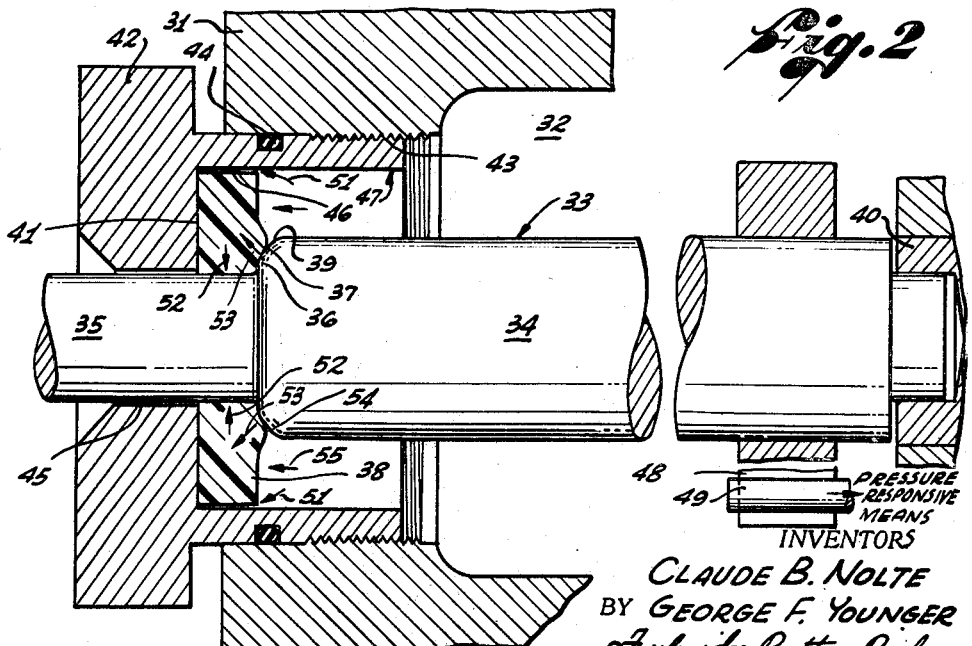
FIGURE 2 is a longitudinal sectional view through the pressure-bearing seal, according to the present invention.

Referring now to FIGURE 2, a high pressure housing 31 provides a pressure chamber 32 for fluids, liquids or gases, under high pressure, for example up to 6,000 p.s.i. A rotary shaft extending from the inside to the outside of the housing 31 is shown at 33 with a major diameter portion 34 and a minor diameter portion 35 providing therebetween a moving sealing face 36. The inboard end of the shaft 33 is supported in a bearing 40.

The intersection between the sealing face 36 and the outer surface of shaft portion 34 is rounded at 37 to engage the high pressure side of a TFE pressure-bearing seal 38. The rounded surface 37 may engage the major diameter surface of shaft portion 34 with a short conical surface 39 to facilitate manufacture, this surface being ineffective and not engaging the seal. The pressure on the shaft 33 within the chamber 32 thrusts the moving shaft seal surfaces 36, 37 against the high pressure side of the bearing seal 38 and forces the bearing seal, in turn, against a static sealing face 41 on the interior end of a gland 42 within which the bearing seal 38 is disposed. The gland 42 is threaded into an opening into the housing 31 at 43 and is provided with an O-ring seal at 44. The shaft portion 35 passes freely through and out of contact with a bore 45 through the outer end of the gland 42.

The axial thickness or length of the bearing seal 38 is desirably half or less than half the diameter of the minor diameter portion 35 of the shaft 33. This may vary, by way of example, to as low as 5 percent of the minor shaft diameter but desirably does not substantially exceed one-half the minor shaft diameter. The peripheral surface 46 of the bearing seal 38 substantially fits the inner bore 47 of the gland 42 and the inner diameter of the bearing seal substantially fits the outer surface of the minor diameter shaft portion 35. The outer diameter of the bearing seal 38 substantially exceeds the major diameter portion 34 of the shaft 33, both to permit the rounded sealing surface 37 to interact freely with the face of the high pressure side of the bearing seal 38 and also to strengthen the bearing seal against radial deflection. This dimension is not critical so long as it is substantially larger than the maximum diameter of the shaft and provides the desired mechanical strength.

The operating force to rotate the shaft 33 may be applied in any manner. Specifically, the invention is particularly applicable in the measurement of differential pressures employing bellows, or like pressure-responsive systems, but it may be used with any other type of actuator where rotary motion is to be transmitted from the inside to the outside of a high pressure vessel. As illustrated, a lever arm 48 rigidly engages the shaft 33 and and actuating arm 49 engages the lever arm 48 to effect rotation of the shaft which may be spring-biased against the arm 49 for return movement. The actuating arm 49 may be connected to any actuating device within the pressure chamber, in the specific example given a differential pressure-responsive bellows system. In such a system, the static pressure within the chamber may be of the order of 2,500–6,000 p.s.i. while the pressure differential to be measured may be quite small, for example, of the order of 1.5–3.6 p.s.i. Despite the small amount of energy available from the pressure differential and the high static pressure, it is desired that the differential pressure be known within 0.1 percent and for this purpose is necessary that the frictional forces in the pressure-bearing seal system for the shaft 33 be quite small, for example, 20 grams centimeters torque or less.

Experiments have shown that the action of the round shoulder 37 on the moving sealing surface of the shaft 33 may reduce pressure-bearing friction by as much as 40 percent for a given combination of dimensions. Making the axial thickness of the TFE bearing seal half or less than half the minor shaft diameter and its outer diameter substantially greater than the major shaft diameter may reduce pressure-bearing friction by approximately 60 percent. Combining the two structures in a tested combination of dimensions gave a reduction of total friction to something under 22 percent of that of the prior art form of FIGURE 1. At the same time, the minor diameter of the shaft was made 50 percent greater than the prior art form, thereby drastically reducing the likelihood of accidental bending of the outboard end of the shaft. In another and previously stated example, the shaft portion 35 of the embodiment of the invention may be three times as strong as the shaft of FIGURE 1 while lowering the frictional resistance to one-third that of FIGURE 1. At the same time, it is to be noted that the thin, axially short bearing seal of this invention has a favorable radius of gyration effect under the columnar load.

Figure 1:
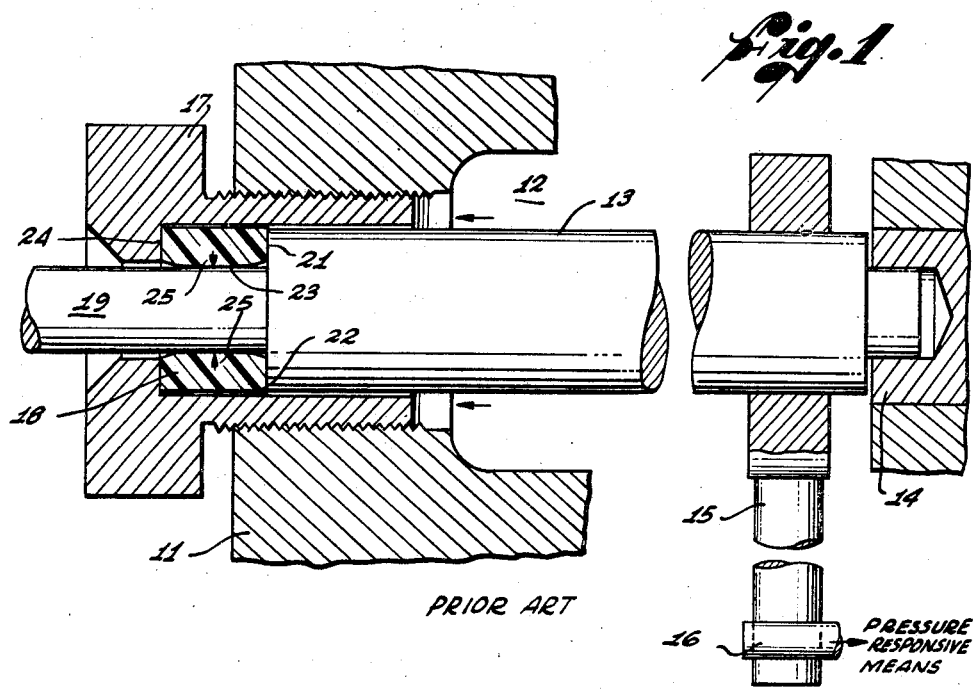
FIGURE 1 is a sectional view through a prior art TFE pressure-bearing seal, as previously described.

One additional effect of the rounded shoulder 37 at the moving seal face is more effective sealing of the pressure-bearing system almost at the instant that pressure is applied in the chamber 32, in contrast to the performance of the prior art structure of Figure 1 wherein the fluid contained in the chamber 12 may leak for a while after pressure is applied in the chamber until the shoulder 21 of the shaft seats into the bearing seal 18. This quick sealing enables the user to determine the effectiveness of the seal in preventing leakage of the pressure fluid almost immediately an instrument is placed in use rather than passing through a waiting period before it is determined that the seal will be effective.

In the pressure-bearing seal of this invention, the high pressure within the chamber 32 is applied to the peripheral surface of the bearing seal 38, as indicated by the arrows 51, but its radially inwardly deflecting effect against the bearing surface of the shaft at the arrows 52 is lessened both by the increased radial thickness of the bearing seal and the upward component of the force from the rounded shoulder 37, the effect of which is indicated by the arrows 53. That the rounded shoulder 37 exerts a significant force is indicated by the bulges 54 on the high pressure side of the bearing seal. The squeezing force on the bearing seal 38 is indicated by the arrows 55 but its effect on radially inward deflection is opposed both by the mechanical strength of the bearing seal and the outward component of the force vector 53.

The result of the TFE bearing seal of this invention is the transfer of rotary motion from within a high pressure vessel to its outside with minimum frictional effects and essentially zero leakage of the high pressure fluid within the pressure vessel. At the same time, a larger output shaft with greater strength may be used and a high degree of accuracy is provided in the measurement of small pressure differentials under high static pressure conditions.

While a certain preferred embodiment of the invention has been particularly illustrated and described, it will be understood that the invention is not limited thereto as many variations will be apparent to those skill in the art and the invention is to be given its broadest interpretation within the terms of the following claims.

What is claimed is:

1. Means for transferring rotary motion from within a high pressure vessel to the outside thereof without leakage of the high pressure medium comprising:
   a rotary shaft of stepped construction having a major diameter portion extending within said vessel and a minor diameter portion extending outside the vessel;
   means in said vessel for rotating said shaft;
   a pressure-bearing seal for said shaft of a plastic resin having a low coefficient of friction;
   said bearing seal having a bore engaging the surface of the minor diameter portion of the shaft adjacent its junction with the major diameter portion;
   a shoulder between said major and minor diameter shaft portions providing a substantially flat, annular surface at right angles to the shaft axis and adjacent the minor diameter shaft portion engaging the high pressure side of said bearing seal as a moving seal face, the low pressure side of said bearing seal engaging a stationary surface as a static seal face;
   the axial thickness of said bearing seal being not substantially greater than one-half the minor diameter of the shaft to lower the frictional resistance to rotation of said shaft; and
   the junction between said flat, annular shoulder surface and the surface of the major diameter shaft portion being rounded and engaging the high pressure side of said bearing seal as at least a part of said moving seal face, said rounded shoulder junction exerting a force on said bearing seal in a direction having a substantial radially outward component to oppose the forces incident to the high pressure within said vessel tending to deflect said bearing seal radially inwardly whereby to decrease the bearing pressure on the axial surface of the shaft.

2. Means for transferring rotary motion from within a high pressure vessel to the outside thereof comprising:
   a rotary shaft of stepped construction having a major diameter portion extending within said vessel and a minor diameter portion extending outside the vessel;

means in said vessel for rotating said shaft;

a pressure-bearing seal for said shaft of a plastic resin having a low coefficient of friction;

said bearing seal having a bore engaging the surface of the minor diameter portion of the shaft adjacent its junction with the major diameter portion;

a shoulder between said major and minor diameter shaft portions providing a substantially flat, annular surface at right angles to the shaft axis and adjacent the minor diameter shaft portion engaging the high pressure side of said bearing seal as a moving seal face, the low pressure side of said bearing seal engaging a stationary surface as a static seal face;

said bearing seal having an outer diameter substantially larger than the major diameter of the shaft to strengthen the bearing seal against radially inward deflection and lessen the pressure exerted by the bearing seal on the axial surface of the minor diameter portion of the shaft; and the junction between said flat, annular shoulder surface and the surface of the major diameter shaft portion being rounded and engaging the high pressure side of said bearing seal as at least a part of said moving seal face, said rounded shoulder junction exerting a force on said bearing seal in a direction having a substantial radially outward component to oppose the forces incident to the high pressure within said vessel tending to deflect said bearing seal radially inwardly whereby to decrease the bearing pressure on the axial surface of the shaft.

3. Means for transferring rotary motion from within a high pressure vessel to the outside thereof without leakage of the high pressure medium comprising:

a rotary shaft of stepped construction having a major diameter portion extending within said vessel and a minor diameter portion extending outside the vessel;

means in said vessel for rotating said shaft;

a pressure-bearing seal for said shaft of plastic resin having a low coefficient of friction;

said bearing seal having a bore engaging the surface of the minor diameter portion of the shaft adjacent its junction with the major diameter portion;

a shoulder between said major and minor diameter shaft portions providing a substantially flat, annular surface at right angles to the shaft axis and adjacent the minor diameter shaft portion engaging the high pressure side of said bearing seal as a moving seal face, the low pressure side of said bearing seal engaging a stationary surface as a static seal face; and the junction between said flat annular shoulder surface and the surface of the major diameter shaft portion being rounded and engaging the high pressure side of said bearing seal as at least a part of said moving seal face, said rounded shoulder junction deforming said high pressure side and exerting a force on said bearing seal in a direction having a substantial radially outward component to oppose the forces incident to the high pressure within said vessel tending to deflect said bearing seal radially inwardly whereby to decrease the bearing pressure on the axial surface of the shaft.

References Cited

UNITED STATES PATENTS

| | | | |
|---|---|---|---|
| 464,332 | 12/1891 | Monroe | 277—81 |
| 1,502,914 | 7/1924 | Joy | 277—96 X |
| 1,923,915 | 8/1933 | Cullen et al. | 277—96 X |
| 2,747,901 | 5/1956 | Clavell | 277—96 X |
| 3,144,163 | 8/1964 | Gasche | 220—46 |
| 3,359,871 | 12/1967 | Kamman | 277—96 X |

FOREIGN PATENTS 190,459    3/1923    Great Britain.

JAMES KEE CHI, Primary Examiner

U.S. Cl. X.R.

277—96